United States Patent
Fujiwara et al.

(10) Patent No.: US 9,740,233 B2
(45) Date of Patent: *Aug. 22, 2017

(54) PEDAL ACTUATION AMOUNT DETECTION DEVICE

(75) Inventors: Noboru Fujiwara, Toyota (JP); Hirofumi Otsuka, Kitasaku-gun (JP)

(73) Assignees: TOYODA IRON WORKS CO., LTD., Toyota (JP); MINEBEA CO., LTD., Kitasaku-gun (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/383,294

(22) PCT Filed: Sep. 13, 2012

(86) PCT No.: PCT/JP2012/073526
§ 371 (c)(1),
(2), (4) Date: Sep. 5, 2014

(87) PCT Pub. No.: WO2013/132682
PCT Pub. Date: Sep. 12, 2013

(65) Prior Publication Data
US 2015/0020642 A1    Jan. 22, 2015

(30) Foreign Application Priority Data
Mar. 7, 2012   (JP) .................. 2012-050193

(51) Int. Cl.
G05G 1/44      (2008.04)
B60T 7/04      (2006.01)
G05G 1/38      (2008.04)

(52) U.S. Cl.
CPC ............... G05G 1/44 (2013.01); B60T 7/042 (2013.01); G05G 1/38 (2013.01); Y10T 74/20528 (2015.01)

(58) Field of Classification Search
CPC .. G05G 1/40; G05G 1/44; G05G 5/03; G05G 1/38; B60T 7/042
See application file for complete search history.

(56) References Cited

U.S. PATENT DOCUMENTS 7,712,371 B2    5/2010  Fujiwara
8,001,836 B2 *  8/2011  Isono .................. B60T 7/042
                                                73/132

(Continued)

FOREIGN PATENT DOCUMENTS

JP    H11-255084 A    9/1999
JP    2000-103325 A   4/2000

(Continued)

OTHER PUBLICATIONS

Portion—Google Search. Dec. 16, 2016.*

(Continued)

*Primary Examiner* — Vinh Luong
(74) *Attorney, Agent, or Firm* — Oliff PLC

(57) ABSTRACT

A pedal operation amount detection apparatus for an operation pedal apparatus that includes a transmitting member including a pedal arm of an operation pedal that is disposed to be pivotable about a support axis and subjected to a depressing operation, and an output member to which a depressing operation force is transmitted from the transmitting member and to which a reaction force corresponding to the depressing operation force is applied, the pedal operation amount detection apparatus includes a sensor member disposed on a load transmission path of the transmitting member and the reaction force and the pedal operation amount detection apparatus electrically detects deformation of the sensor member. The sensor member is an elongate member that is torsionally and elastically deformable about a torsion center line in a longitudinal direction and is disposed at a (Continued)

position offset from the transmitting member in a direction parallel to the support axis.

6 Claims, 7 Drawing Sheets

(56) References Cited

U.S. PATENT DOCUMENTS

| | | | |
|---|---|---|---|
| 8,707,820 B2 | 4/2014 | Fujiwara | |
| 9,442,030 B2* | 9/2016 | Fujiwara | B60T 7/042 |
| 2006/0162434 A1* | 7/2006 | Saito | B60T 7/042 |
| | | | 73/132 |
| 2008/0223171 A1 | 9/2008 | Fujiwara et al. | |
| 2008/0307920 A1 | 12/2008 | Fujiwara | |
| 2009/0049932 A1* | 2/2009 | Isono | B60T 7/042 |
| | | | 73/862.625 |
| 2012/0255372 A1* | 10/2012 | Isono | B60T 7/042 |
| | | | 73/862.621 |
| 2013/0167664 A1 | 7/2013 | Fujiwara et al. | |
| 2013/0263688 A1* | 10/2013 | Fujiwara | G01L 1/2237 |
| | | | 74/512 |
| 2015/0020642 A1 | 1/2015 | Fujiwara et al. | |

FOREIGN PATENT DOCUMENTS

| | | |
|---|---|---|
| JP | 2008-309585 A | 12/2008 |
| WO | 2011/077231 A1 | 6/2011 |

OTHER PUBLICATIONS

Sep. 18, 2015 Office Action issued in U.S. Appl. No. 13/819,530.
Sep. 17, 2013 Office Action issued in Japanese Aplication No. 2010-200137.
Mar. 5, 2014 Office Action issued in Chinese Application No. 201180043076.7.
Aug. 9, 2011 International Search Report issued in International Application No. PCT/JP2011/062780.
Aug. 30, 2012 International Preliminary Report on Patentability issued in International Application No. PCT/JP2011/062780.
Nov. 13, 2012 Written Opinion Issued in International Application No. PCT/JP2012/073526.
Nov. 13, 2012 International Search Report issued in PCT/JP2012/073526.
Nov. 16, 2015 extended Search Report issued in European Patent Application No. 12870815.3.
Jan. 15, 2016 Office Action issued in U.S. Appl. No. 13/819,530.
May 5, 2016 Notice of Allowance issued in U.S. Appl. No. 13/819,530.

* cited by examiner

PEDAL ACTUATION AMOUNT DETECTION DEVICE

TECHNICAL FIELD

The invention relates generally to a pedal operation amount detection apparatus, and more specifically to a pedal operation amount detection apparatus that ensures a high degree of detection accuracy.

BACKGROUND ART

There is an operation pedal apparatus that includes: a transmitting member including a pedal aria of an operation pedal that is disposed so as to be pivotable about a support axis and subjected to a depressing operation; and an output member to which a depressing operation force is transmitted from the transmitting member and to which a reaction force corresponding to the depressing operation force is applied. For the operation pedal apparatus, a pedal operation amount detection apparatus that includes a sensor member disposed on a load transmission path of the transmitting member and deformed by the depressing operation force and the reaction force and that electrically detects deformation of the sensor member is proposed as an apparatus that detects a depressing operation force or a depression stroke of, for example, a brake pedal for a service brake, a brake pedal for a parking brake, an accelerator pedal, or a clutch pedal in a vehicle.

RELATED ART DOCUMENT

Patent Document

Patent Document 1: Japanese Patent Application Publication No. 2000-103325

SUMMARY OF THE INVENTION

Problems to be Solved by the Invention

However, such a conventional pedal operation amount detection apparatus electrically detects bending deformation of the sensor member having an elongate shape. Therefore, if an attempt is made to improve the detection accuracy by increasing a deformation amount of the sensor member without changing a size of the sensor member, the breaking limit of the sensor member is lowered, whereas if an attempt is made to raise the breaking limit by, for example, enhancing the stiffness of the sensor member, the detection accuracy is lowered. That is, there is a problem that improvement in the detection accuracy of the sensor member and raising of the breaking limit of the sensor member are not compatible with each other.

The invention is made in the light of the above-described circumstances, and an object of the invention is to provide a pedal operation amount detection apparatus that electrically detects deformation of a sensor member disposed on a load transmission path between a pedal arm and an output member and that is configured compactly without lowering the stiffness (breaking limit) and to increase the deformation amount of the sensor member, thereby improving the detection accuracy.

Means for Solving the Problem

To achieve the object, the first aspect of the invention provides a pedal operation amount detection apparatus for an operation pedal apparatus that includes a transmitting member including a pedal arm of an operation pedal that is disposed so as to be pivotable about a support axis and subjected to a depressing operation, and an output member to which a depressing operation force is transmitted from the transmitting member and to which a reaction force corresponding to the depressing operation force is applied, the pedal operation amount detection apparatus including a sensor member disposed on a load transmission path of the transmitting member and deformed by the depressing operation force and the reaction force and the pedal operation amount detection apparatus electrically detecting deformation of the sensor member, the pedal operation amount detection apparatus characterized in that: (a) the sensor member is an elongate member that is torsionally and elastically deformable about a torsion center line S in a longitudinal direction and is disposed at a position offset from the transmitting member in a direction parallel to the support axis; (b) one of an operation input portion at which the depressing operation force is applied to the sensor member and a reaction force acting portion at which the reaction force is applied to the sensor member is set at a position apart from the torsion center line S in a direction parallel to the support axis; and (c) the operation input portion and the reaction force acting portion are set at positions offset from each other in a direction parallel to the support axis.

The second aspect of the invention provides the pedal operation amount detection apparatus recited in the first aspect of the invention, wherein (a) the sensor member includes a pair of rod-shaped torsional deformation portions that are symmetrical with respect to the torsion center line S and parallel to the torsion center line S, the sensor member having an 8-shape in which both ends and a center of one of the torsional deformation portions in a longitudinal direction thereof and both ends and a center of the other one of the torsional deformation portions in a longitudinal direction thereof are respectively coupled to each other via three coupling portions; and (b) the sensor member is disposed in such a posture that an 8-shape is formed when seen from an axial direction of the support axis, and the depressing operation force is transmitted to one of a pair of end portion coupling portions and a remaining center coupling portion among the three coupling portions, and the reaction force is transmitted to the other one of the pair of end portion coupling portions and the remaining center coupling portion.

The third aspect of the invention provides the pedal operation amount detection apparatus recited in the first or second aspect of the invention, wherein (a) the transmitting member is a plate member having a flat portion perpendicular to the support axis, and is disposed so as to be pivotable about the support axis or an axis parallel to the support axis; (b) the sensor member is disposed parallel to a side face of the flat portion of the transmitting member; (c) the pedal operation amount detection apparatus is provided with a cylindrical member that is fixedly fitted to an intermediate portion of the sensor member in the longitudinal direction so as to protrude in a direction perpendicular to the torsion center line S and parallel to the support axis, the cylindrical member being inserted in a through-hole formed in the transmitting member with a play, (d) a bushing through which a coupling pin is passed, the bushing concentrically and fixedly fitted to an inner side of a portion of the cylindrical member, the portion protruding from the sensor member, and (e) a pair of support pins fixedly fitted to the transmitting member so as to protrude toward the sensor member parallel to the cylindrical member, and inserted in a pair of support holes formed at respective end portions of the sensor member in the longitudinal direction to be relatively rotatable and to support the sensor member; and (f) one of a pair of contact portions at which the pair of support pins and the support holes contact each other and a contact portion at which the bushing and the coupling pin contact each other serves as the operation input portion, and the other serves as the reaction force acting portion.

The fourth aspect of the invention provides the pedal operation amount detection apparatus recited in the third aspect of the invention, wherein (a) a clevis pin that serves as the coupling pin is passed through the bushing so as to be rotatable relative to the bushing and so as to pass through a bifurcated clevis, the transmitting member, and the sensor member to protrude on both sides in a state where the transmitting member and the sensor member are inserted in the bifurcated clevis that is fixedly fitted to the output member; and (b) the reaction force is applied to the sensor member from the clevis pin via the cylindrical member, and the depressing operation force is applied to the sensor member from the transmitting member via the pair of support pins.

The fifth aspect of the invention provides the pedal operation amount detection apparatus recited in the third or fourth aspect of the invention, wherein (a) the transmitting member is the pedal arm; and (b) the depressing operation force is applied to the sensor member from the pedal arm via the pair of support pins, and the reaction force is applied to the sensor member from the coupling pin via the cylindrical member.

The sixth aspect of the invention provides the pedal operation amount detection apparatus recited in any one of the first to fourth aspects of the invention (a) comprising an intermediate lever disposed so as to be pivotable about an axis parallel to the support axis and coupled to the pedal arm via a coupling link, (b) the transmitting member being the intermediate lever.

Effects of the Invention

In the pedal operation amount detection apparatus as described above, the elongate sensor member that is torsionally and elastically deformable about the torsion center line S is disposed at a position that is offset from the transmitting member in a direction parallel to the support axis and one of the operation input portion and the reaction force acting portion is set at a position that is apart from the torsion center line S in a direction parallel to the support axis, and thus the sensor member is subjected to bending deformation and also subjected to torsional deformation about the torsion center line S at the time of a pedal operation. Thus, it is possible to increase a deformation amount of the sensor member (relative displacement stroke between the operation input portion and the reaction force acting portion) in a small space without lowering the stiffness unlike in a case where the sensor member is subjected to only the bending deformation, and it is thus possible to improve detection accuracy while forming the detection apparatus compactly.

In the second aspect of the invention, because the 8-shaped sensor member having the pair of rod-shaped torsional deformation portions is used, the detection apparatus is configured compactly while a required strength of the sensor member is easily ensured.

In the third aspect of the invention, because the sensor member is disposed on the side face of the transmitting member (pedal arm and intermediate lever or the like), the dimension of the operation pedal apparatus in the front-back direction is maintained at substantially the same level as that in a conventional apparatus, unlike in a case where a detection apparatus is provided in series between the operation pedal and the output member (operating rod) as in, for example, Patent Document 1, a compact configuration is achieved. Further, because the opposite end portions of the sensor member in the longitudinal direction are respectively supported by the paired support pins fixedly fitted to the transmitting member, the posture of the sensor member is stabilized and the detection accuracy is improved. Further, the cylindrical member is fixedly fitted to the intermediate portion of the sensor member and inserted in the through-hole formed in the transmitting member, the coupling pin is passed through the bushing fixedly disposed in the cylindrical member, and the both ends of the coupling pin are supported, so that the depressing operation force or the reaction force can be applied to the coupling pin. Thus, the posture of the coupling pin is stabilized, which contributes to an improvement in the detection accuracy and, for example, when the excessive depressing operation force is applied and the cylindrical member comes into contact with the through-hole, it is possible to appropriately prevent excessive deformation and damage of the sensor member.

A fitting position of the bushing relative to the cylindrical member is easily changed and thus a position of the operation input portion or the reaction force acting portion that is the contact portion at which the bushing contacts the coupling pin is easily adjusted. That is, because a moment arm length of the operation input portion or the reaction force acting portion varies depending on the fitting position of the bushing, it is possible to appropriately set change characteristics of the torsional deformation amount of the sensor member with respect to the depressing operation force, and it is thus possible to appropriately enhance the detection accuracy in the pedal working range irrespective of the stiffness of the sensor member.

In the fourth aspect of the invention, because the sensor member is disposed at a coupling portion between the output member and the transmitting member, and the pedal operation amount transmitted to the output member is detected, it is possible to highly accurately detect a braking force of a hydraulic brake that is mechanically operated via the output member. Further, in a state where the transmitting member and the sensor member are inserted in the bifurcated clevis fixedly fitted to the output member, the clevis pin, which serves as the coupling pin, is passed through the bushing so as to be rotatable relative to the bushing in such a manner that the clevis pin extends through the clevis, the transmitting member, and the sensor member to protrude on both sides, and the both ends of the clevis pin are supported by the clevis. Thus, the posture of the clevis pin is stabilized, which improves the detection accuracy.

The fifth aspect of the invention is the case where the transmitting member is the pedal arm, and the sixth aspect of the invention is the case of the intermediate lever.

In both cases, because the sensor member is disposed on the side faces of the pedal arm and the intermediate lever without necessity of a major design change, the pedal operation amount (depressing operation force and depressing stroke) can be easily detected electrically.

BRIEF DESCRIPTION OF THE DRAWINGS

FIG. 5B is a sectional view taken along the line VB-VB indicated by arrows in FIG. 5A.

MODES FOR CARRYING OUT THE INVENTION

Figure 1:
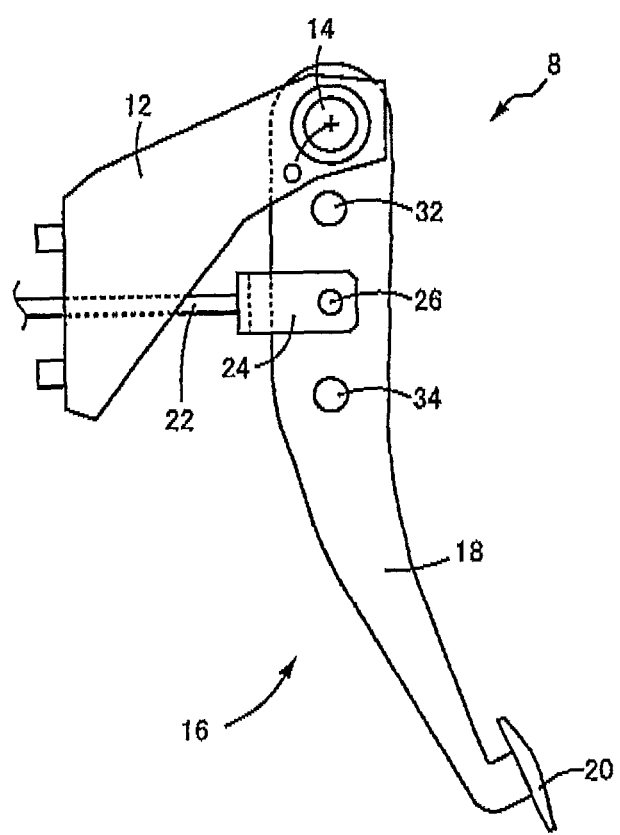
FIG. 1 is a schematic diagram depicting an example of a vehicle operation pedal apparatus for a service brake to which the present invention is applied and a left side view seen from the left side of a vehicle.

The pedal operation amount detection apparatus according to the invention is preferably applied to a brake pedal apparatus for a service brake, but may be applied to other vehicle operation pedal apparatuses for an accelerator, a clutch, a parking brake, and the like. The pedal operation amount detection apparatus according to the invention may be applied to other operation pedal apparatuses than those for a vehicle. The pedal operation amount detection apparatus electrically detects deformation of the sensor member and the deformation of the sensor member corresponds to a depressing operation force. However, generally, the depression stroke of the operation pedal also varies in accordance with the depressing operation force, and hence the pedal operation amount detection apparatus is configured to detect one of or both the depressing operation force and the depression stroke as a pedal operation amount. The depressing operation force is not restricted to an input into a pedal, but may be, for example, an output to an output member. The depressing operation force or the depression stroke described above may be obtained from, for example, a map or an operational expression in which an deformation amount of the sensor member, that is, an electrical signal is determined as a parameter.

In order to detect deformation of the sensor member, a strain gauge or the like is disposed at a deformation portion of the sensor member. Alternatively, various kinds of deformation detecting means may be adopted. For example, displacement of a prescribed portion of the sensor member, for example, displacement (rotation) of a distal end of a cylindrical member fixedly fitted to the sensor member may be detected by, for example, a displacement sensor or a rotation sensor.

The output member is, for example, an operating rod of a brake booster or a push rod of a brake master cylinder, and is configured to mechanically actuate a wheel brake or the like. However, the output member may be applied to an electrical (by-wire-type) operation pedal apparatus that electrically controls the wheel brake or a vehicle drive apparatus in accordance with an electrically detected pedal operation amount. In this case, a stroke simulator, a reaction force mechanism, or the like is coupled to the output member, so that a prescribed reaction force is applied to the output member.

One of the operation input portion and the reaction force acting portion is set at a position apart from the torsion center line S in a direction parallel to the support axis. This arrangement is made with the intention of causing the depressing operation force or the reaction force applied in a direction perpendicular to the direction parallel to the support axis to act on a position offset from the torsion center line S and producing a moment so that the sensor member is twisted about the torsion center line S. For example, as in the third invention, one of the operation input portion and the reaction force acting portion is set at a position that is offset in a direction perpendicular to the torsion center line S and parallel to the support axis. However, the position of one of the operation input portion and the reaction force acting portion is not particularly limited as long as it is apart from the torsion center line S in a direction at least parallel to the support axis. The sensor member is not subjected to simple torsional deformation but twisted about the torsion center line S while bending in the axial direction.

Although both the depressing operation force and the reaction force are applied in directions perpendicular to the direction parallel to the support axis, the directions are opposite to each other. Therefore, even if both the operation input portion and the reaction force acting portion are set at positions that are apart from the torsion center line S in the direction parallel to the support axis by the same distance, the sensor member is twisted about the torsion center line S. However, the operation input portion and the reaction force acting portion are set at positions that are offset from each other in the direction parallel to the support axis.

The sensor member having an 8-shape is used in the second invention. However, when the other inventions are implemented, various other forms may be adopted. For example, the sensor member may be a simply linear round bar or angular bar or may be curved in an arc shape or bent. As the 8-shape, for example, an 8-shape with angled four corners (a rectangular shape partitioned into two rectangular regions by one line) is preferably adopted. However, the four corners need not be at perfect right angle. The four corners may each be rounded like an arc, or may be chamfered so as to have tilted portions.

In the third invention, the sensor member is disposed parallel to the side face of the flat portion of the transmitting member. However, when the first invention is implemented, various other forms may be adopted. For example, the sensor member may be disposed at a front end edge of the pedal arm or the intermediate lever. The cylindrical member is formed separately from the sensor member and fixedly fitted to the sensor member by press-fitting, welding or the like. However, if possible, the cylindrical member and the sensor member may be formed so as to be integrated with each other. The support pins are also formed separately from the transmitting member and fixedly fitted to the transmitting member by welding or the like as needed. However, if possible, the support pins and the transmitting member may be formed so as to be integrated with each other.

Because the cylindrical member fixedly fitted to the sensor member is disposed in such a posture as to intersect with an input direction of the depressing operation force or the reaction force at a substantially right angle, the cylindrical member is efficiently pivoted about the torsion center line S by the depressing operation force or the reaction force, so that the sensor member is subjected to torsional deformation about the torsion center line S. The cylindrical member may be pivoted about the torsion center line S over the entire range of the depression stroke. Alternatively, the cylindrical member may be pivoted only in a pedal working range. In this case, when an excessive depressing operation force or reaction force is applied, the cylindrical member is brought into contact with the through-hole of the transmitting member, thereby preventing further torsional deformation of the sensor member. Thus, it is possible to appropriately detect a pedal operation amount within the pedal working range and appropriately avoid excessive deformation or damage of the sensor member when an excessive depressing operation force is applied.

Further, because there is a possibility that torsional deformation will be inhibited if the sensor member is in contact with the transmitting member, it is desirable to dispose the sensor member on the side face of the transmitting member in a state where the sensor member is apart from the transmitting member by a prescribed distance to float above the transmitting member except both end portions supported by the support pins. Washers or the like having small friction may be interposed between the transmitting member and the both end portions supported by the support pins.

In the fourth invention, the clevis is fixedly fitted to the output member and the output member is coupled to the cylindrical member of the sensor member via the clevis pin so as to be rotatable relative to the cylindrical member. However, the position at which the sensor member is disposed is determined as needed. For example, when the intermediate lever is coupled to the operation pedal via the coupling link and the output member is coupled to the intermediate lever via the clevis or the like so as to be rotatable relative to the intermediate lever, the sensor member may be disposed at a portion of the operation pedal, to which the coupling link is coupled, or at a portion of the intermediate lever, to which the coupling link is coupled, and the coupling link may be coupled to the cylindrical member so as to be rotatable relative to the coupling link.

The invention also relates to, for example, a pedal operation amount detection apparatus for an operation pedal apparatus that includes a transmitting member including a pedal arm of an operation pedal that is disposed so as to be pivotable about a support axis and subjected to a depressing operation, and an output member to which a depressing operation force is transmitted from the transmitting member and to which a reaction force corresponding to the depressing operation force is applied, the pedal operation amount detection apparatus including a sensor member disposed on a load transmission path of the transmitting member and deformed by the depressing operation force and the reaction force and the pedal operation amount detection apparatus electrically detecting deformation of the sensor member, the pedal operation amount detection apparatus characterized in that: (a) the sensor member is an elongate member that is torsionally and elastically deformable about a torsion center line S in a longitudinal direction, and both end portions in the longitudinal direction are supported by a pair of support pins fixedly fitted to the transmitting member so as to be parallel to the support axis, so that the sensor member is disposed at a position offset from the transmitting member in a direction parallel to the support axis; (b) a fitting hole is formed in an intermediate portion of the sensor member in the longitudinal direction so as to be parallel to the support pin, and a cylindrical member having one end portion that protrudes from the sensor member in a direction parallel to the support axis is fixedly fitted in the fitting hole; (c) a bushing is concentrically and fixedly fitted to an inner side of a portion of the cylindrical member, the portion protruding from the sensor member, and a coupling pin is passed through the bushing; and (d) one of a pair of supported portions supported by the pair of support pins and a contact portion at which the bushing and the coupling pin contact each other serves as an operation input portion to which the depressing operation force is applied, and the other serves as a reaction force acting portion to which the reaction force is applied, and the operation input portion and the reaction force acting portion are offset from each other in a direction parallel to the support axis.

Embodiment 1

Hereinafter, embodiments of the invention will be described in detail with reference to the drawings.

Figure 2:
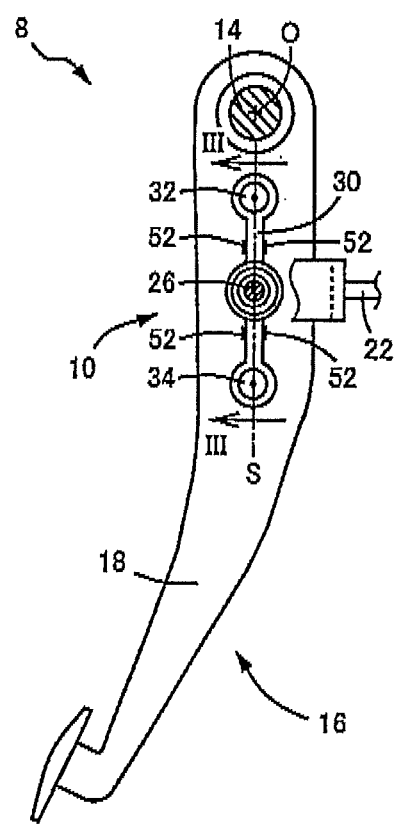
FIG. 2 is a partially omitted right side view of the vehicle operation pedal apparatus of FIG. 1.
Figure 3:
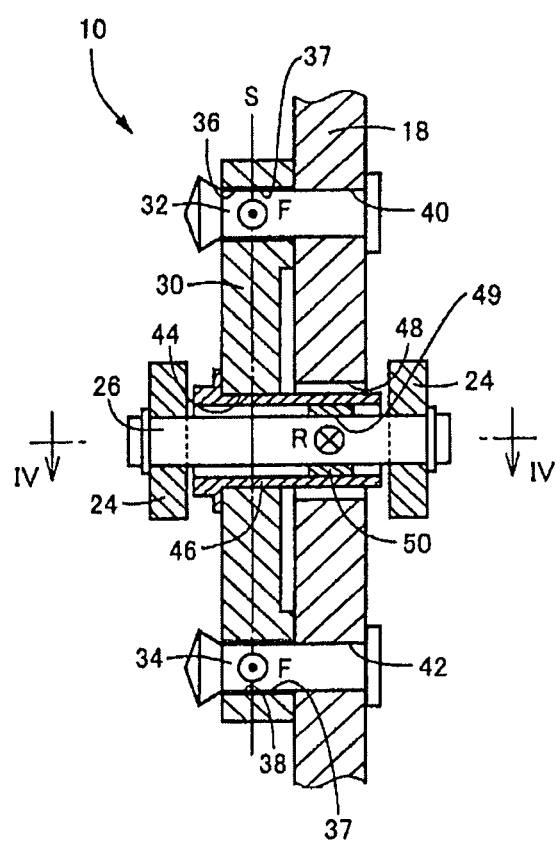
FIG. 3 is an enlarged view of a section taken along the line indicated by arrows in FIG. 2.
Figure 4A:
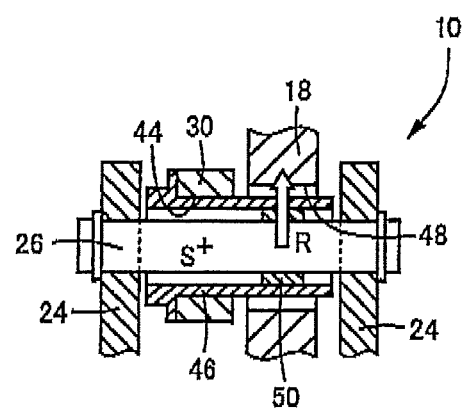
FIGS. 4A and 4B illustrate views of a section taken along the line IV-IV indicated by arrows in FIG. 3 and views for describing a manner of deformation caused by a reaction force R.

FIG. 1 to FIG. 4 are views for describing a vehicle operation pedal apparatus 8 for a service brake, which is provided with a pedal operation amount detection apparatus 10 according to an embodiment of the invention. FIG. 1 is a left side view seen from the left side of a vehicle in an in-vehicle mounted state. FIG. 2 is a partially omitted right side view. FIG. 3 is an enlarged view of a section taken along the line III-III indicated by arrows in FIG. 2. FIG. 4 illustrates views of a section taken along the line IV-IV indicated by arrows in FIG. 3 and views for describing a manner of deformation caused by a reaction force R. In FIG. 1, an operation pedal 16 is disposed on a pedal support 12 fixedly fitted to a vehicle so as to be pivotable about an axis (support axis) O of a substantially horizontal support axis 14. The operation pedal 16 is depressed by a driver in response to a braking command, and includes a pedal arm 18 that is perpendicular to the support axis O and that is in the form of a flat and elongate plate. A depressed portion (pad) 20 is disposed at a lower end portion of the pedal arm 18, and an operating rod 22 of a brake booster is coupled to an intermediate portion (a portion above the center in the up-down direction) via the pedal operation amount detection apparatus 10. The operation pedal 16 corresponds to an input member to which a depressing operation force F is applied, and the operating rod 22 corresponds to an output member to which the depressing operation force F is transmitted from the operation pedal 16 via the pedal operation amount detection apparatus 10 and to which the reaction force R corresponding to the depressing operation force F is applied from the brake booster. Note that, in the case of a by-wire-type operation pedal apparatus that electrically controls a wheel brake, a reaction force member to which a prescribed reaction force is applied by a reaction force mechanism or the like is coupled in place of the operating rod 22.

A bifurcated (U-shaped) clevis 24 is fixedly fitted to an end portion of the operating rod 22 by screw coupling or the like, and the clevis 24 is coupled to the pedal operation amount detection apparatus 10 via a columnar clevis pin 26 that is parallel to the support axis 14 and that has a circular section. The pedal operation amount detection apparatus 10 is configured to include a sensor member 30 having a generally linear angular rod shape with a rectangular section. The sensor member 30 is disposed on a side face of the pedal arm 18 that is perpendicular to the support axis O and that is in the form of a flat plate, that is, disposed at a position that is offset from the pedal arm 18 in a direction parallel to the support axis O. The sensor member 30 is disposed on the pedal arm 18 via a pair of support pins 32, 34, at opposite end portions in the longitudinal direction. The support pins 32, 34 are fixedly press-fitted in pin holes 40, 42 formed in the pedal arm 18 or integrally fixed in the pin holes 40, 42 by welding or the like so as to perpendicularly protrude toward the sensor member 30, namely, protrude parallel to the support axis O. Further, the support pins 32, 34 are passed through support holes 36, 38 formed in the sensor member 30 so as to be rotatable relative to the sensor member 30, and distal end portions of the support pins 32, 34 are swaged, so that the support pins 32, 34 are prevented from being removed. The sensor member 30 is torsionally and elastically deformable about a torsion center line S that substantially coincides with the axis in the longitudinal direction. In the present embodiment, the sensor member 30 is disposed in such a posture that the torsion center line S intersects with the support axis O at a substantially right angle. The pedal arm 18 corresponds to a transmitting member, and the entirety of the pedal arm 18 is a flat portion perpendicular to the support axis O.

A collar fitting hole 44 is formed at the center of the sensor member 30 in the longitudinal direction, that is, at an intermediate position between the paired support pins 32, 34, and a cylindrical collar 46 is fixedly press-fitted in the collar fitting hole 44 or integrally fixed in the collar fitting hole 44 by welding, or the like so as to protrude toward the pedal arm 18 parallel to the support pins 32, 34, that is, protrude in a direction perpendicular to the torsion center line S and parallel to the support axis O. A through-hole 48 is formed in the pedal arm 18 so as to be parallel to the support axis O, and the collar 46 is passed through the through-hole 48 with a prescribed play. Further, a bushing 50 is concentrically and fixedly fitted, by press-fitting or the like, to a distal end portion of an inner peripheral face of the collar 46, the distal end portion protruding from the sensor member 30. In the present embodiment, the distal end portion is a portion located at an intermediate position of the pedal arm 18 in the plate thickness direction. The clevis pin 26 is passed through the bushing 50 so as to be rotatable relative to the bushing 50 while being in sliding contact with an inner peripheral face of the bushing 50. The pedal arm 18 and the sensor member 30 are inserted into the bifurcated clevis 24, opposite end portions of the clevis pin 26 that passes through the collar 46 and protrudes on both sides are supported by the clevis 24, and the clevis pin 26 is prevented, by a snap ring or the like, from being removed. The collar 46 corresponds to a cylindrical member, and the clevis pin 26 corresponds to a coupling pin.

The sensor member 30 is disposed on an upper half of the pedal arm 18 along the pedal arm 18 in the up-down direction, and coupled to the pedal arm 18 via the clevis pin 26 in such a posture as to be substantially perpendicular to the operating rod 22 that is disposed substantially horizontally toward the front of the vehicle and that is pushed forward by the pedal arm 18. Thus, when the operation pedal 16 is depressed with the depressing operation force F, the depressing operation force F is applied to the sensor member 30 from the pedal arm 18 via the pair of support pins 32, 34 and transmitted from the collar 46 to the operating rod 22 via the bushing 50 and the clevis pin 26 while the reaction force R is applied to the collar 46 from the clevis pin 26 via the bushing 50.

That is, as illustrated in FIG. 3, the depressing operation force F, which is headed in a direction from the back side of a sheet on which FIG. 3 is drawn toward the front side of the sheet, is applied to both the upper and lower end portions of the sensor member 30 in the longitudinal direction from the pair of support pins 32, 34, while the reaction force R, which is headed in a direction from the front side of the sheet toward the back side of the sheet, is applied to the distal end portion of the collar 46 from the bushing 50. Thus, the sensor member 30 is subjected to bending deformation in accordance with the depressing operation force F and the reaction force R in such a manner that the central portion of the sensor member 30 in the longitudinal direction relatively bends in a direction toward the back side of the sheet on which FIG. 3 is drawn. A prescribed play is formed between the support pins 32, 34 and the support holes 36, 38 so as to allow the bending deformation of the sensor member 30.

Figure 4B:
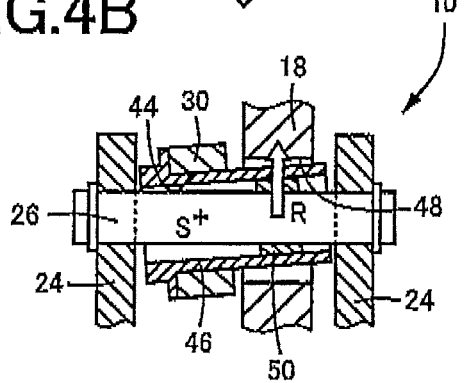

Further, because the reaction force R is applied to the distal end portion of the collar 46, which is apart from the torsion center line S, the collar 46 is tilted (rotated) in a direction in which the reaction force R acts as illustrated in FIG. 4B, and the sensor member 30 is subjected to torsional deformation in a counterclockwise direction about the torsion center line S. A play between the collar 46 and the through-hole 48 is determined so as to allow such displacement or tilt of the collar 46, and is set to have such dimensions that the collar 46 comes into contact with the through-hole 48 when the depressing operation force F exceeds a prescribed pedal working range to prevent further displacement of the collar 46, that is, further deformation of the sensor member 30. The wall thickness or the like of the bushing 50 is also determined so as to allow the collar 46 to tilt by a prescribed angle. As a result, it is possible to appropriately detect the depressing operation force F in the pedal working range, and it is possible to appropriately prevent excessive deformation and damage of the sensor member 30 when the excessive depressing operation force F is applied. A prescribed play is formed between the bushing 50 and the clevis pin 26 as needed so as to allow the bushing 50 to tilt relative to the clevis pin 26 together with the collar 46.

Further, when the deformation of the sensor member 30 due to the flexural deformation (bending deformation) and the torsional deformation is electrically detected by, for example, a deformation detecting means 52 (see FIG. 2) such as a strain gauge disposed on a side face of the sensor member 30, the depressing operation force F is calculated as a pedal operation amount based on a prescribed map or an operational expression. The deformation detecting means 52 are provided at multiple positions so as to form, for example, a bridge circuit.

In this case, although the sensor member 30 and the operating rod 22 are pivoted relative to each other about an axis of the clevis pin 26 in response to depressing operation of the operation pedal 16, a fitting posture of the sensor member 30 relative to the pedal arm 18 is set in such a manner that the sensor member 30 is maintained at such a posture that the sensor member 30 intersects with an input direction of the reaction force R over the entire depression stroke range. If the sensor member 30 is in contact with the pedal arm 18, the deformation becomes unstable due to sliding resistance. Therefore, the sensor member 30 is disposed so as to be parallel to the side face of the pedal arm 18 in a state where the sensor member 30 is apart from the pedal arm 18 by a prescribed distance so as to float above the pedal arm 18 except the opposite end portions supported by the support pins 32, 34. Thus, the sensor member 30 is deformed always in a substantially constant deformation manner by the depressing operation force F and the reaction force R. Depression stroke of the operation pedal 16 may be obtained from a map or the like in place of the depressing operation force F or in addition to the depressing operation force F. The depressing operation force F may be not only an input into the operation pedal 16 but also an output to the operating rod 22.

In the present embodiment, the support pins 32, 34 are fixedly fitted to the pedal arm 18, and each of contact portions at which the support pins 32, 34 and the support holes 36, 38 contact each other, that is, each of supported portions of the sensor member 30, which are supported by the support pins 32, 34, is an operation input portion 37 at which the depressing operation force F acts on the sensor member 30. Further, a contact portion at which the clevis pin 26 and the bushing 50 contact each other is a reaction force acting portion 49 at which the reaction force R acts on the sensor member 30.

As described above, in the pedal operation amount detection apparatus 10 according to the present embodiment, the elongate sensor member 30 that is torsionally and elastically deformable about the torsion center line S is disposed at a position that is offset from the pedal arm 18 in a direction parallel to the support axis O and the reaction force acting portion 49 on which the reaction force R acts is set at a position that is apart from the torsion center line S in a direction parallel to the support axis O, and thus the sensor member 30 is subjected to bending deformation and also subjected to torsional deformation about the torsion center line S at the time of a pedal operation. Thus, it is possible to increase a deformation amount of the sensor member 30 (relative displacement stroke between the operation input portion 37 and the reaction force acting portion 49) in a small space without lowering the stiffness unlike in a case where the sensor member 30 is subjected to only the bending deformation, and it is thus possible to improve detection accuracy while forming the pedal operation amount detection apparatus 10 compactly.

Further, because the sensor member 30 is disposed on the side face of the pedal arm 18, the dimension of the vehicle operation pedal apparatus 8 in the front-back direction is maintained at substantially the same level as that in a conventional apparatus, unlike in a case where a detection apparatus is provided in series between the operation pedal 16 and the operating rod 22 as in, for example, Patent Document 1, a compact configuration is achieved and ease in mounting the apparatus in a vehicle is improved. Especially, because the sensor member 30 is disposed on the side face of the pedal arm 18, a major design change is not required and the depressing operation force F is easily detected electrically.

Further, because the opposite end portions of the sensor member 30 in the longitudinal direction are respectively supported by the paired support pins 32, 34 fixedly fitted to the pedal arm 18, the posture of the sensor member 30 is stabilized and the detection accuracy is improved.

Further, the collar 46 is fixedly fitted to the intermediate portion (the center in the embodiment) of the sensor member 30 in the longitudinal direction and inserted in the through-hole 48 formed in the pedal arm 18, the clevis pin 26 is passed through the collar 46 so as to be rotatable relative to the collar 46 via the bushing 50 fixedly disposed in the collar 46, and the both ends of the clevis pin 26 are supported by the clevis 24, so that the reaction force R is applied to the clevis pin 26. Thus, the posture of the clevis pin 26 is stabilized, which contributes to an improvement in the detection accuracy.

Further, because the bushing 50 is fixedly fitted to the inner peripheral face of the collar 46 by press-fitting or the like, a fitting position of the bushing 50 is easily changed and thus a position of the reaction force acting portion 49 that is the contact portion at which the bushing 50 contacts the clevis pin 26 is easily adjusted. That is, because a moment arm length of the reaction force R varies depending on the fitting position of the bushing 50, it is possible to appropriately set change characteristics of the torsional deformation amount of the sensor member 30 with respect to the depressing operation force F, and it is thus possible to appropriately enhance the detection accuracy in the pedal working range irrespective of the stiffness of the sensor member 30.

Further, because the sensor member 30 is disposed at a coupling portion at which the operating rod 22, which is the output member, and the pedal arm 18 are coupled to each other and the depressing operation force F transmitted to the operating rod 22 is detected, it is possible to highly accurately detect a braking force of a hydraulic brake that is mechanically operated via the operating rod 22.

Further, in a state where the pedal arm 18 and the sensor member 30 are inserted in the bifurcated clevis 24 fixedly fitted to the operating rod 22, the clevis pin 26, which serves as the coupling pin, is passed through the bushing 50 so as to be rotatable relative to the bushing 50 in such a manner that the clevis pin 26 extends through the clevis 24, the pedal arm 18, and the sensor member 30 to protrude on both sides, and the both ends of the clevis pin 26 are supported by the clevis 24. Thus, the posture of the clevis pin 26 is stabilized, which improves the detection accuracy.

Further, the play between the through-hole 48 and the collar 46 is set to have such dimensions that the collar 46 comes into contact with the through-hole 48 when the depressing operation force F exceeds the prescribed pedal working range to prevent further displacement of the collar 46, that is, further deformation of the sensor member 30. As a result, it is possible to appropriately detect the depressing operation force F in the pedal working range, and it is possible to appropriately prevent excessive deformation and damage of the sensor member 30 when the excessive depressing operation force F is applied.

Embodiment 2

Next, another embodiment according to the invention will be described. In the following embodiment, like reference numerals denote elements substantially the same as those in the foregoing embodiment to omit the detailed description thereof.

Figure 5A:
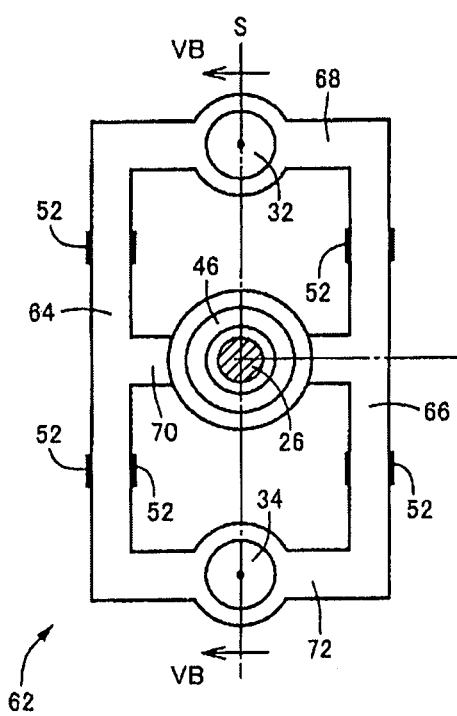
FIGS. 5A and 5B are a diagram for explaining another example of the present invention and FIG. 5A is a front view seen from the axial direction of the support axis O.
Figure 5B:
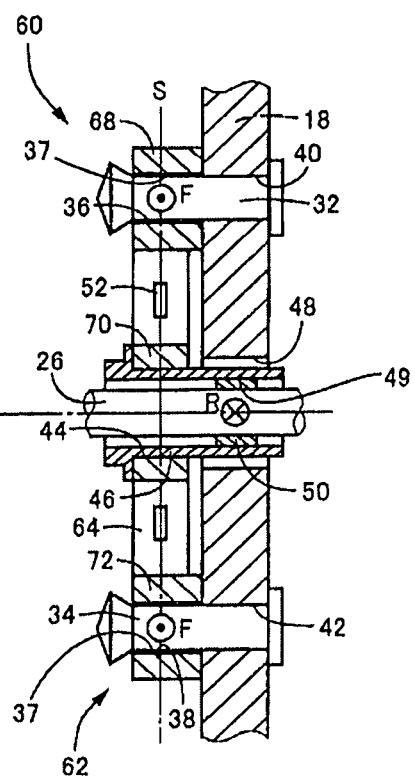

A pedal operation amount detection apparatus 60 in FIG. 5 is different from the foregoing embodiment in a configuration (shape) of a sensor member 62. FIG. 5A is a front view seen from the axial direction of the support axis O, that is, a view seen from the right side in FIG. 5B, and FIG. 5B is a sectional view taken along the line VB-VB indicated by arrows in FIG. 5A that is, a sectional view corresponding to FIG. 3. The sensor member 62 includes a pair of angular rod-shaped torsional deformation portions 64, 66 each having a rectangular section, the torsional deformation portions 64, 66 being symmetrical with respect to the torsion center line S and being parallel to the torsion center line S. The sensor member 62 is formed into an angular 8-shape (a rectangular shape partitioned into two rectangular regions by one line) in which both ends and the center of the torsional deformation portion 64 in the longitudinal direction and both ends and the center of the torsional deformation portion 66 in the longitudinal direction are respectively coupled to each other via three angular rod-shaped coupling portions 68, 70, 72 each having a rectangular section. The sensor member 62 is disposed on the side face of the pedal arm 18 in such a posture that an 8-shape is formed when seen from the axial direction of the support axis O. The support holes 36, 38 are formed in the centers of a pair of end portion coupling portions 68, 72 that couple the both ends of the torsional deformation portion 64 and the both ends of the torsional deformation portion 66 to each other, among the three coupling portions 68, 70, 72, that is, the support holes 36, 38 are formed in portions of the coupling portions 68, 72, through which the torsion center line S passes. Thus, the coupling portions 68, 72 are supported by the support pins 32, 34. Further, the collar fitting hole 44 is formed in the center of the central coupling portion 70 that couples the centers of the torsional deformation portions 64, 66 to each other, that is, the collar fitting hole 44 is formed in the portion of the central coupling portion 70, through which the torsion center line S passes, and the collar 46 is fixedly fitted in the collar fitting hole 44. Further, the deformation detecting means 52 are fitted to each of both side faces of each of the paired torsional deformation portions 64, 66, at two positions one of which is above the central coupling portion 70 and the other of which is below the central coupling portion 70, that is, the deformation detecting means 52 are fitted to portions subjected to torsional deformation in accordance with pedal operation force F. Thus, the deformation is electrically detected.

Also in the present embodiment, the sensor member 62 is subjected to bending deformation and also subjected to torsional deformation about the torsion center line S at the time of a pedal operation. Thus, it is possible to increase a deformation amount of the sensor member 62 (relative displacement stroke between the operation input portion 37 and the reaction force acting portion 49) in a small space without lowering the stiffness unlike in a case where the sensor member 62 is subjected to only the bending deformation, and it is thus possible to improve detection accuracy while forming the pedal operation amount detection apparatus 60 compactly. As a result, the same effect is acquired as the above described embodiment.

Further, in the present embodiment, because the 8-shaped sensor member 62 having the pair of rod-shaped torsional deformation portions 64, 66 is used, the pedal operation amount detection apparatus 60 is configured compactly while a required strength of the sensor member 62 is easily ensured.

Embodiment 3

Figure 6:
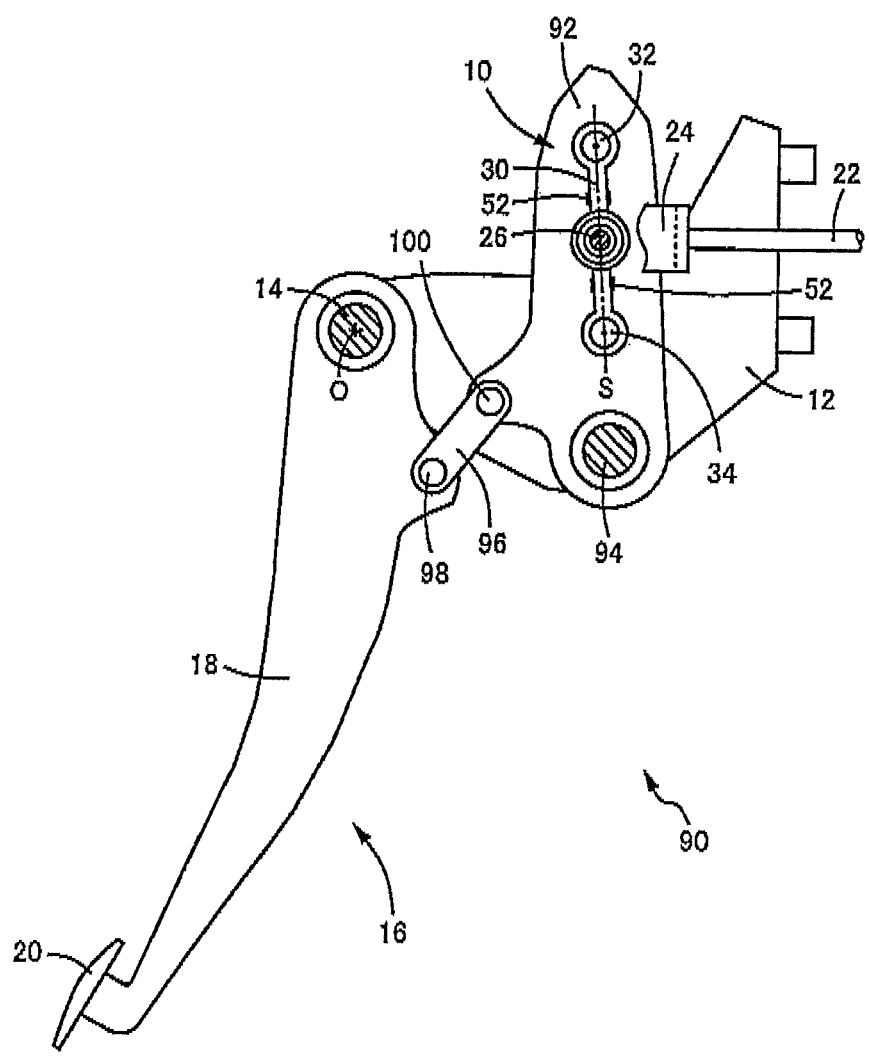
FIG. 6 is a diagram for explaining an example when the present invention is applied to the vehicle operation pedal apparatus including an intermediate lever and is a right side view corresponding to FIG. 2.

A vehicle operation pedal apparatus 90 in FIG. 6 includes an intermediate lever 92. An operation force is transmitted from the operation pedal 16 to the operating rod 22 via the intermediate lever 92. FIG. 6 is a right side view corresponding to FIG. 2. The intermediate lever 92 is disposed on the pedal support 12 so as to be pivotable about a support pin 94 that is parallel to the support axis 14. The intermediate lever 92 is coupled to the operation pedal 16 via a coupling link 96, and mechanically pivoted about the support pin 94 in accordance with a depressing operation of the operation pedal 16. The coupling link 96 is coupled at respective end portions to the operation pedal 16 and the intermediate lever 92 via a pair of coupling pins 98, 100 parallel to the support axis 14, respectively.

Further, the pedal operation amount detection apparatus 10 is disposed on the intermediate lever 92 via the pair of support pins 32, 34, and the pedal operation amount detection apparatus 10 is coupled to the operating rod 22 via the clevis pin 26 that is passed through the bushing 50 fixedly fitted to the collar 46 so as to be rotatable relative to the bushing 50. In the present embodiment, substantially the same operations and effects as those in the foregoing embodiment in FIG. 1 are obtained. In the present embodiment, the intermediate lever 92 corresponds to a transmitting member, and has a shape of a flat plate perpendicular to the support axis O.

Note that, in the embodiment in FIG. 6, the pedal operation amount detection apparatus 60 in FIG. 5 may be adopted in place of the pedal operation amount detection apparatus 10. Further, the pedal operation amount detection apparatus according to the invention may be disposed at one of coupling portions at which the coupling link 96 is coupled to the pedal arm 18 and the intermediate lever 92 via the coupling pins 98, 100 so as to be pivotable relative to the pedal arm 18 and the intermediate lever 92. That is, the pedal operation amount detection apparatus 10 or 60 may be disposed at a portion of the pedal arm 18, to which the coupling link 96 is coupled, and the coupling pin 98 may be passed through the bushing 50 in the collar 46 so as to be rotatable relative to the bushing 50 to couple the pedal operation amount detection apparatus 10 or 60 to the pedal arm 18, or the pedal operation amount detection apparatus 10 or 60 may be disposed at a portion of the intermediate lever 92, to which the coupling link 96 is coupled, and the coupling pin 100 may be passed through the bushing 50 in the collar 46 so as to be rotatable relative to the bushing 50 to couple the pedal operation amount detection apparatus 10 or 60 to the intermediate lever 92.

Embodiment 4

Figure 7A:
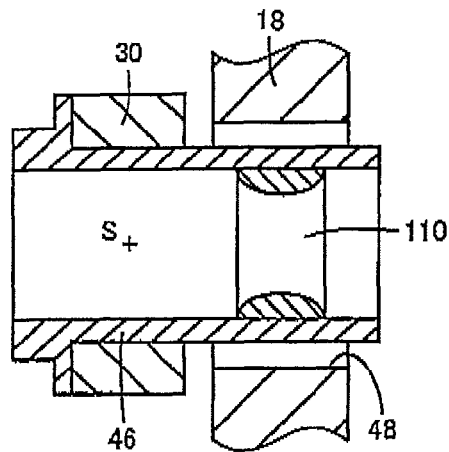
FIGS. 7A to 7E are a cross sectional view for explaining other forms preferably used as a bushing of each of the embodiments.
Figure 7B:
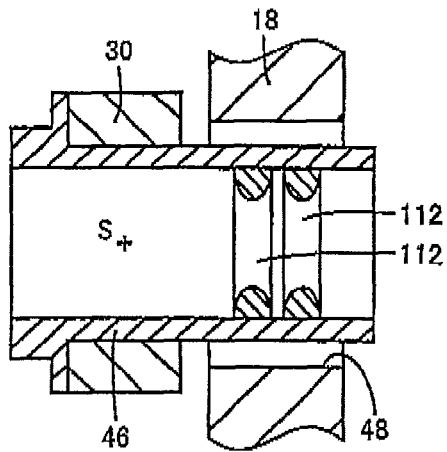
Figure 7C:
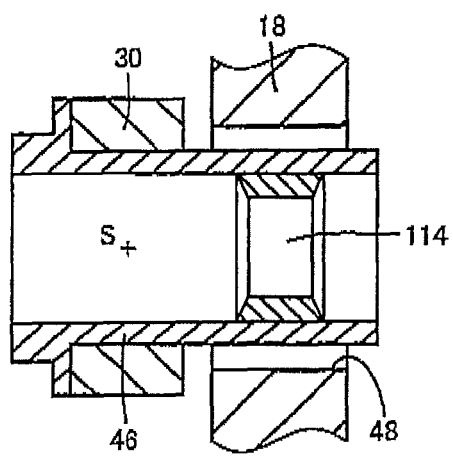
Figure 7D:
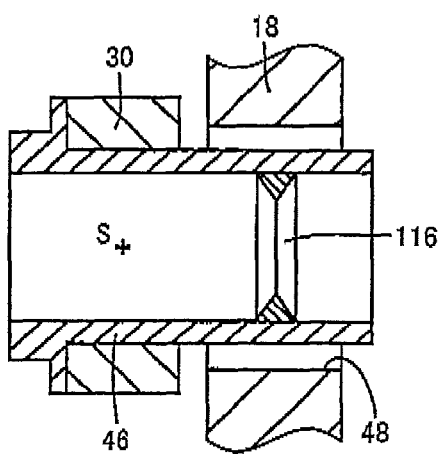
Figure 7E:
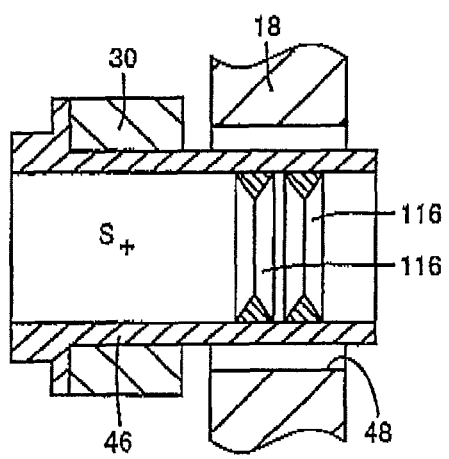

FIGS. 7A to 7E are views illustrating other forms of a bushing fixedly fitted at a prescribed position on the inner peripheral face of the collar 46 by press-fitting or the like. A bushing 110 in FIG. 7A is curved in an arc shape in the axial direction in such a manner that an inner peripheral face thereof bulges inward. FIG. 7B illustrates a case where a pair of bushings 112 having the same shape is disposed in such a manner that the bushings 112 are slightly apart from each other in the axial direction. The bushings 112 are curved in such a manner that inner peripheral faces thereof bulge inward, as in FIG. 7A A bushing 114 in FIG. 7C has a trapezoidal section, and a bushing 116 in FIG. 7D has a triangular section. FIG. 7E illustrates a case where a pair of bushings 116 in FIG. 7D is disposed in such a manner that the bushings 116 are slightly apart from each other in the axial direction. With each of the bushings 110, 116 in FIG. 7A, FIG. 7D because a contact length over which the bushing 110, 116 contacts the clevis pin 26 is short, the collar 46 is smoothly pivoted about the torsion center line S even if a play between the bushing 110, 116 and the clevis pin 26 is small.

While example embodiments of the invention have been described in detail with reference to the drawings, each of the example embodiments is merely one mode for carrying out the invention. The invention may be implemented in various modes achieved by making various changes and improvements based on the knowledge of a person skilled in the art.

Nomenclature of Elements 8, 90: vehicle operation pedal apparatus 10, 60: pedal operation amount detection apparatus 16: operation pedal 18: pedal arm (transmitting member) 22: operating rod (output member) 26: clevis pin (coupling pin) 30, 62: sensor member 32, 34: support pin 36, 38: support hole 46: collar (cylindrical member) 48: through-hole 50, 110, 112, 114, 116: bushing 64, 66: torsional deformation portion 68, 72: end portion coupling portion 70: central coupling portion 92: intermediate lever (transmitting member) 96: coupling link O: support axis F: depressing operation force R: reaction force S: torsion center line.

The invention claimed is:

1. A pedal operation amount detection apparatus for an operation pedal apparatus that includes a plate member of an operation pedal that is disposed so as to be pivoted about a support axis and subjected to a depressing operation, and an output member to which a depressing operation force is transmitted from the plate member and to which a reaction force corresponding to the depressing operation force is applied, the pedal operation amount detection apparatus including a sensor member disposed on a load transmission path of the plate member and configured to be deformed by the depressing operation force and the reaction force, and the pedal operation amount detection apparatus electrically detecting deformation of the sensor member, the sensor member being an elongate member that is configured to be torsionally and elastically deformed by the depressing operation force and the reaction force about a torsion center line extending in a longitudinal direction of the sensor member and being disposed at a position offset from the transmitting member in a direction parallel to the support axis;

one of an operation input portion to which the depressing operation force acting on the sensor member is applied and a reaction force acting portion to which the reaction force acting on the sensor member is applied being set at a position apart from the torsion center line in a direction parallel to the support axis;

the operation input portion and the reaction force acting portion being set at positions offset from each other in a direction parallel to the support axis, the plate member having a flat portion perpendicular to the support axis, and being disposed so as to be pivoted about the support axis or an axis parallel to the support axis;

the sensor member being disposed parallel to a side face of the flat portion of the plate member;

the pedal operation amount detection apparatus is provided with a cylindrical member that is fixedly fitted to an intermediate portion of the sensor member in the longitudinal direction so as to protrude in a direction perpendicular to the torsion center line and parallel to the support axis, the cylindrical member being inserted in a through-hole formed in the plate member with a play, a bushing through which a coupling pin is passed, the bushing concentrically and fixedly fitted to an inner side of a portion of the cylindrical member, the portion protruding from the sensor member, and a pair of support pins fixedly fitted to the plate member so as to protrude toward the sensor member parallel to the cylindrical member, and inserted in a pair of support holes formed at respective end portions of the sensor member in the longitudinal direction to be relatively rotated and to support the sensor member; and one of a pair of contact portions at which the pair of support pins and the support holes contact each other and a contact portion at which the bushing and the coupling pin contact each other serves as the operation input portion, and the other serving as the reaction force acting portion.

2. The pedal operation amount detection apparatus according to claim 1, wherein the sensor member includes a pair of rod-shaped torsional deformation portions that are symmetrical with respect to the torsion center line and parallel to the torsion center line, the sensor member having an 8-shape in which both ends and a center of one of the pair of torsional deformation portions in a longitudinal direction thereof and both ends and a center of the other one of the pair of torsional deformation portions in a longitudinal direction thereof are respectively coupled to each other via three coupling portions; and the sensor member is disposed in such a posture that an 8-shape is formed when seen from an axial direction of the support axis, and the depressing operation force is transmitted to one of a pair of end portion coupling portions and a remaining center coupling portion among the three coupling portions, and the reaction force is transmitted to the other one of the pair of end portion coupling portions and the remaining center coupling portion.

3. The pedal operation amount detection apparatus according to claim 1, wherein a clevis pin that serves as the coupling pin is passed through the bushing so as to be rotated relative to the bushing and so as to pass through a bifurcated clevis, the plate member, and the sensor member to protrude on both sides in a state where the plate member and the sensor member are inserted in the bifurcated clevis that is fixedly fitted to the output member; and the reaction force is applied to the sensor member from the clevis pin via the cylindrical member, and the depressing operation force is applied to the sensor member from the plate member via the pair of support pins.

4. The pedal operation amount detection apparatus according to claim 1, wherein the plate member is a pedal arm of the operation pedal; and the depressing operation force is applied to the sensor member from the pedal arm via the pair of support pins, and the reaction force is applied to the sensor member from the coupling pin via the cylindrical member.

5. The pedal operation amount detection apparatus according to claim 1, wherein the plate member is an intermediate lever disposed so as to be pivoted about the axis parallel to the support axis and coupled to a pedal arm of the operation pedal via a coupling link.

6. The pedal operation amount detection apparatus according to claim 1, wherein each of the support pins fixed to the plate member is inserted in a corresponding one of the support holes of the sensor member with a play defined therebetween.

* * * * *